United States Patent [19]
Phelps

[11] Patent Number: 5,305,542
[45] Date of Patent: Apr. 26, 1994

[54] AERATED BAIT CONTAINER

[76] Inventor: Kenneth D. Phelps, P.O. Box 3791, Bartlesville, Okla. 74006

[21] Appl. No.: 36,354

[22] Filed: Mar. 24, 1993

[51] Int. Cl.⁵ ............... A01K 97/05; A01K 97/10; A01K 97/06
[52] U.S. Cl. .................... 43/21.2; 43/54.1; 43/57
[58] Field of Search ............. 43/57, 21.2, 55, 56, 43/54.1

[56] References Cited

U.S. PATENT DOCUMENTS

| | | | |
|---|---|---|---|
| 1,604,971 | 11/1926 | Churchill | 43/57 |
| 2,736,983 | 3/1956 | Hostetter | 43/57 |
| 2,767,509 | 10/1956 | Breithaupt | 43/57 |
| 2,863,255 | 12/1958 | Slipka | 43/57 |
| 3,603,019 | 9/1971 | Smeltzer | 43/54.1 |
| 3,835,575 | 9/1974 | Kelley et al. | 43/57 |
| 4,037,349 | 7/1977 | Key | 43/57 |
| 4,712,327 | 12/1987 | Ross, Sr. et al. | 43/57 |

Primary Examiner—Paula A. Bradley
Assistant Examiner—Jeanne M. Elpel
Attorney, Agent, or Firm—Leon Gilden

[57] ABSTRACT

A bait container includes an underlying bait compartment removably mounted relative to the container, with the container having a bait reservoir container mounted to a top wall of the container, with a manual pump operative through a bladder reservoir to provide for aeration of bait within the bait reservoir container.

4 Claims, 3 Drawing Sheets

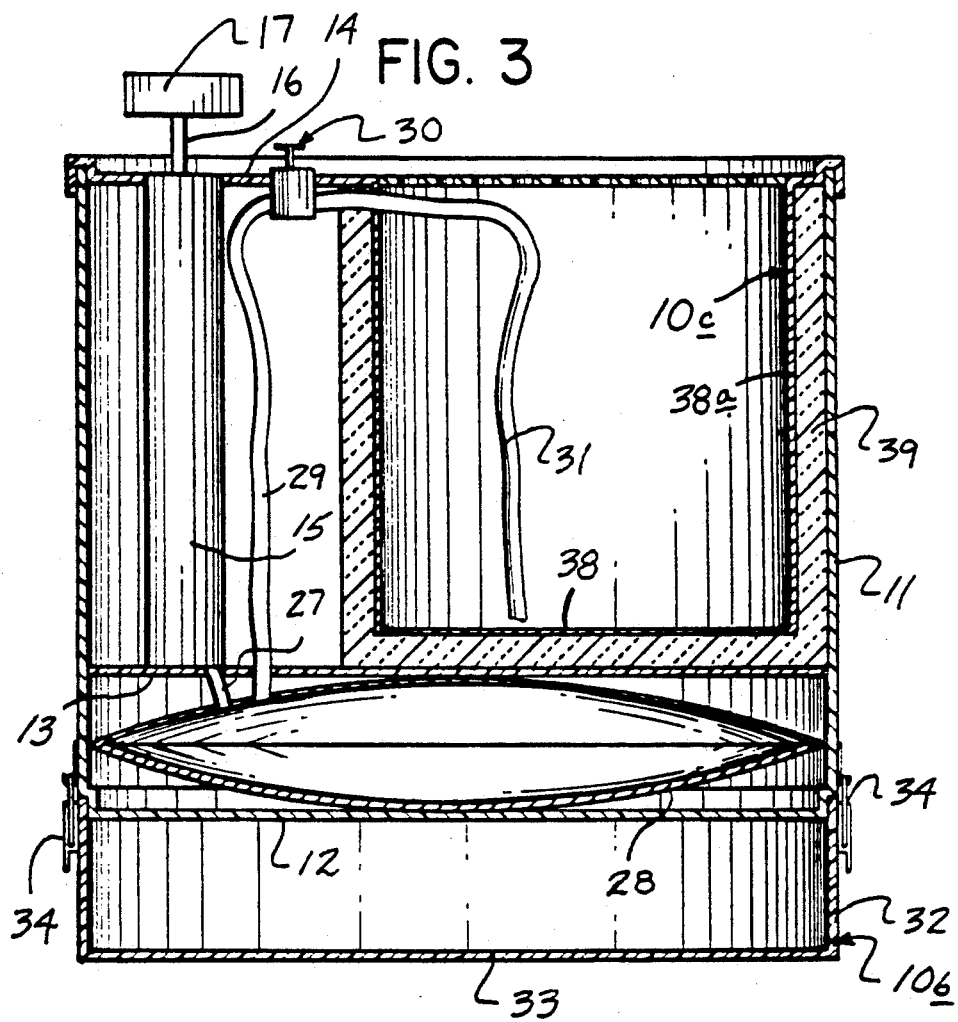
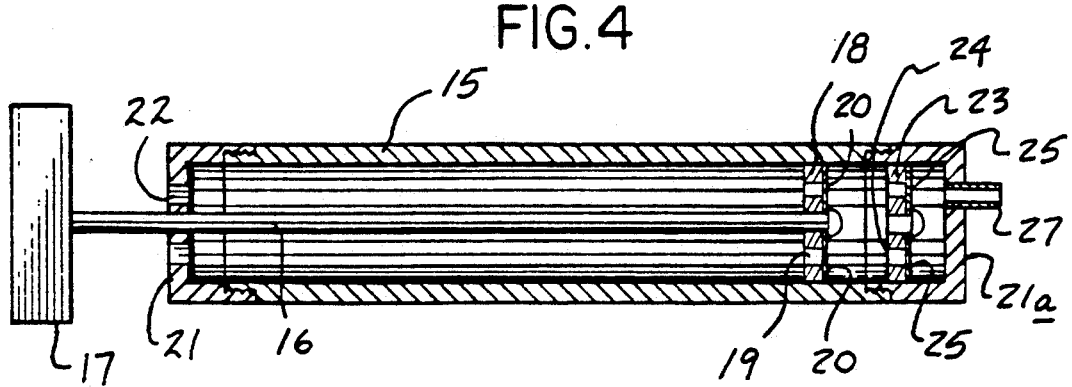

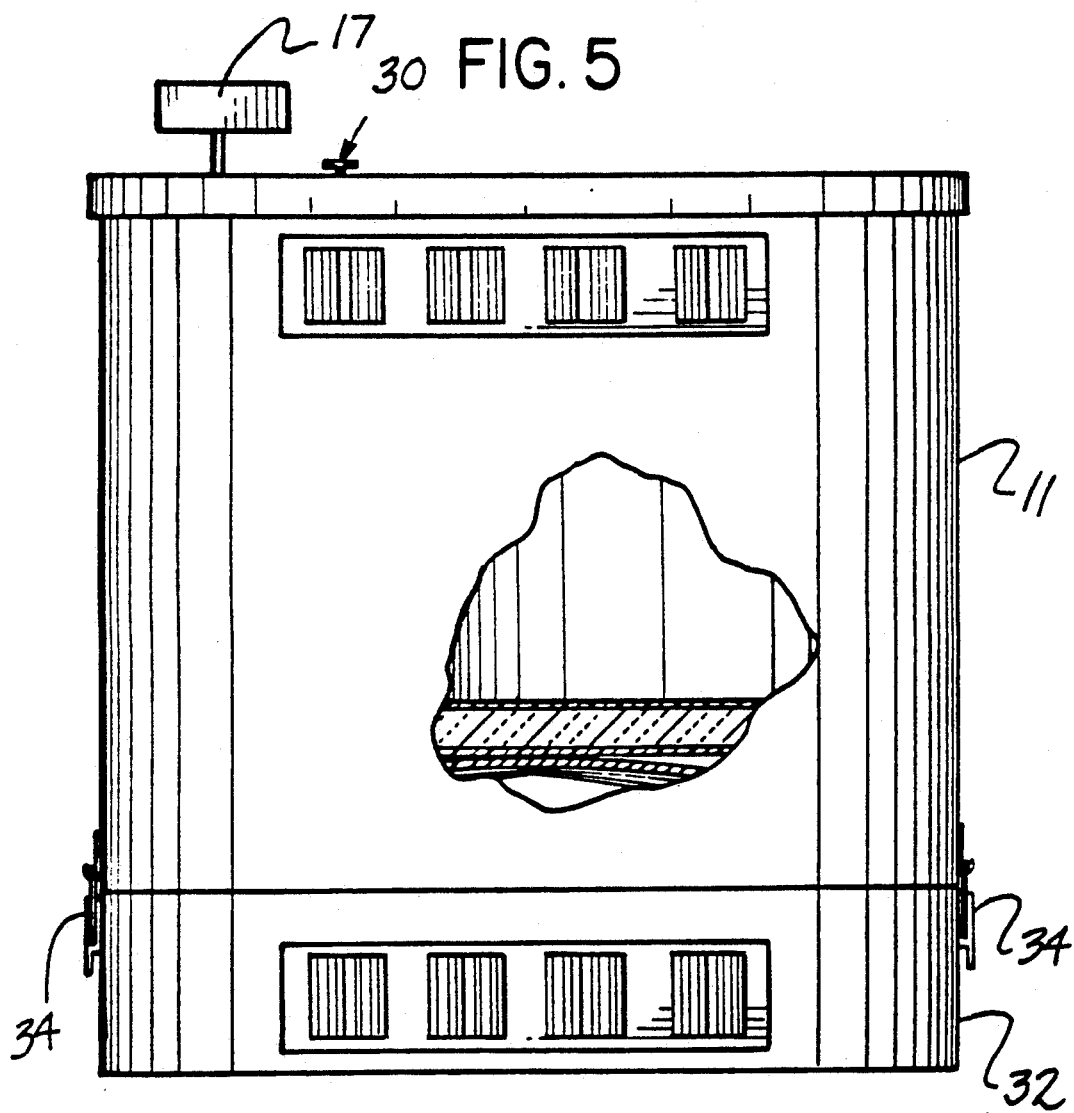

AERATED BAIT CONTAINER

BACKGROUND OF THE INVENTION

1. Field of the Invention

The field of invention relates to bait container structure, and more particularly pertains to a new and improved bait container apparatus wherein the same is directed to the aeration of bait within a bait container portion to promote longevity of bait for use in a fishing procedure.

2. Description of the Prior Art

Bait containers of various types have been utilized throughout the prior art and exemplified in U.S. Pat. No. 4,757,636 wherein a bait container includes an aeration structure utilizing a pump mounted below the container operative through a battery and drive motor.

Similarly, U.S. Pat. No. 4,677,785 to Lamborn sets forth a bait container with an aeration pump mounted below the container.

U.S. Pat. No. 3,710,502 to Bracey includes an aeration structure relative to a bait having a pressure container for oxygen and a valve operative to direct air into an underlying water supply.

The instant invention attempts to overcome deficiencies of the prior art by providing for a pneumatic manual pump /perative to provide for the selective inflation of a bladder metered through a valve structure to effect aeration of a bait container and in this respect, the present invention substantially fulfills this need.

SUMMARY OF THE INVENTION

In view of the foregoing disadvantages inherent in the known types of bait container apparatus now present in the prior art, the present invention provides a bait container apparatus wherein the same employs a manual pump to effect aeration of a bait container organization. As such, the general purpose of the present invention, which will be described subsequently in greater detail, is to provide a new and improved bait container apparatus which has all the advantages of the prior art bait container apparatus and none of the disadvantages.

To attain this, the present invention provides a bait container including an underlying bait compartment removably mounted relative to the container, with the container having a bait reservoir container mounted to a top wall of the container, with a manual pump operative through a bladder reservoir to provide for aeration of bait within the bait reservoir container.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patient or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved bait container apparatus which has all the advantages of the prior art bait container apparatus and none of the disadvantages.

It is another object of the present invention to provide a new and improved bait container apparatus which may be easily and efficiently manufactured and marketed.

It is a further object of the present invention to provide a new and improved bait container apparatus which is of a durable and reliable construction.

An even further object of the present invention is to provide a new and improved bait container apparatus which is susceptible of a low cost of manufacture with regard to both materials and labor, and which accordingly is then susceptible of low prices of sale to the consuming public, thereby making such bait container apparatus economically available to the buying public.

Still yet another object of the present invention is to provide a new and improved bait container apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is an orthographic cross-sectional illustration of the bait container structure.

FIG. 4 is an orthographic cross-sectional illustration of the pneumatic pump structure.

FIG. 5 is an orthographic view of the invention, partially in section, indicating a bubbling structure.

DESCRIPTION OF THE PREFERRED EMBODIMENT

Figure 1:
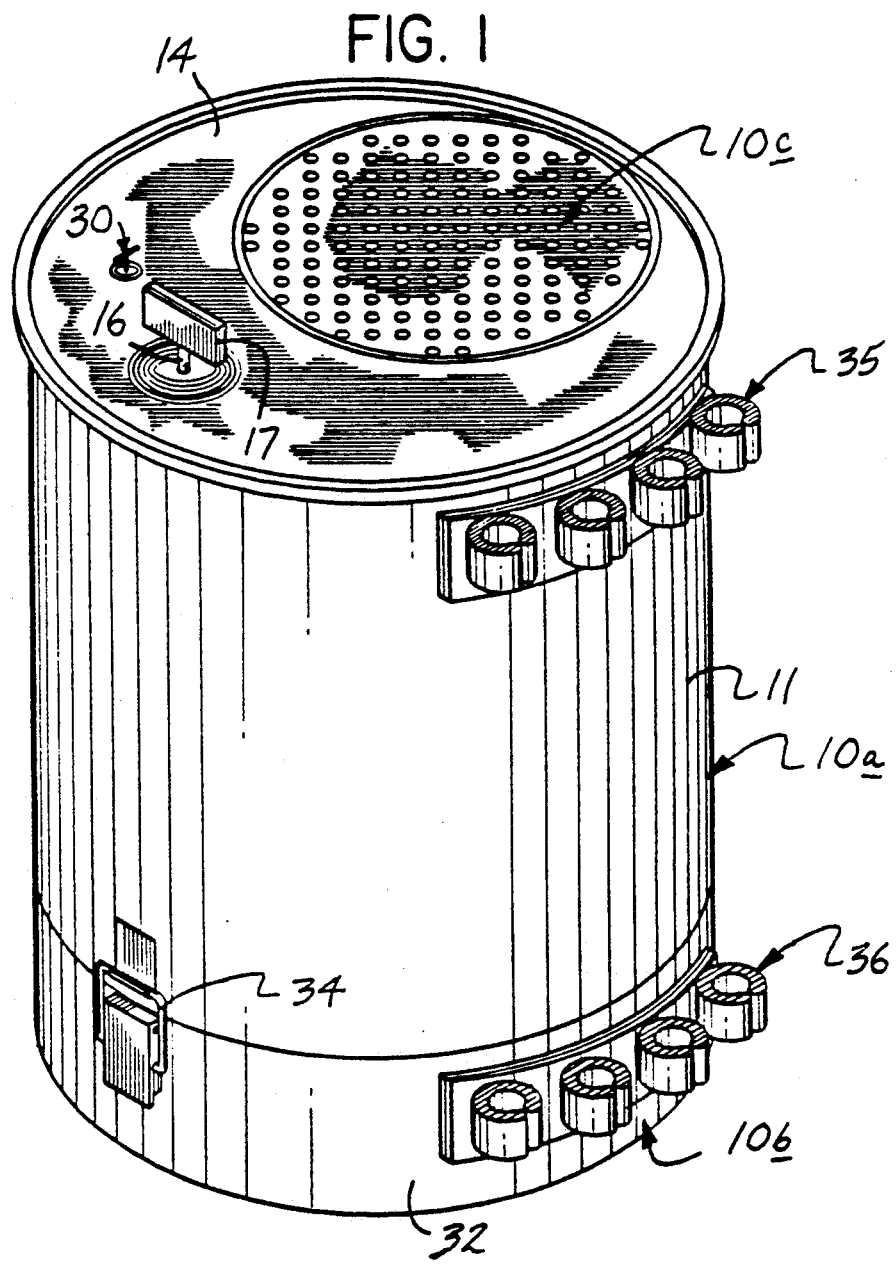
FIG. 1 is an isometric illustration of the invention.
Figure 2:
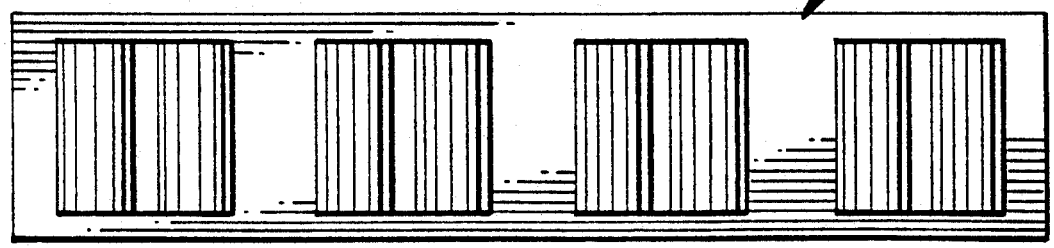
FIG. 2 is an orthographic view of one of the C-shaped clip row arranged for mounting fishing poles to the bait container.

With reference now to the drawings, and in particular to FIGS. 1 to 5 thereof, a new and improved bait container apparatus embodying the principles and concepts of the present invention and generally designated by the reference numeral 10 will be described.

More specifically, the bait container apparatus 10 of the instant invention essentially comprises a primary container 10a mounting a secondary container 10b to a primary container first floor 12. A first side wall 11 is arranged in surrounding relationship relative to the primary container 10a, with the primary container and the secondary container coaxially aligned about a unitary predetermined axis. The primary container 10a includes a second floor 13 spaced above the first floor 12 and between a top wall 14. A pneumatic pump body 15 is integrally and fixedly mounted between the top wall 14 and the second floor 13, including a pneumatic pump rod 16 having a rod handle 17. A piston 18 mounted within the pneumatic pump body 15 includes a plurality of piston apertures 19 directed therethrough, having a flexible first web 20 mounted to the piston in facing relationship relative to a valve plate 23 having valve plate apertures 24 directed therethrough, with the valve plate 23 further including a flexible second web 25. Upon projection of the piston towards the valve plate 23, the first web 20 is maintained in a sealing relationship relative to the piston, while simultaneously effecting deflection of the second web 25 relative to the apertured valve plate 23 directing pressurized air through the valve plate into a first conduit 27. Upon raising of the piston in a displaced orientation relative to the valve plate, the first web 20 is displaced relative to the piston permitting reception of air between the piston and the valve plate, wherein such air is received through top wall apertures 22 of the pump body top wall 21 that is spaced relative to the pump body bottom wall 21a. The first conduit 27 is directed through the pump body bottom wall 21a, as illustrated, in pneumatic communication with a pneumatic bladder reservoir 28 mounted within primary container 10a between the first floor 12 and the second floor 13. A second conduit 29 is directed from the pneumatic bladder reservoir 28 to a valve 30, that includes a valve handle directed through the top wall 14 to permit opening and closure respectively of the valve 30 permitting pressurized air from the bladder reservoir 28 through the second conduit 29, the valve 30, and a third conduit 31 that is directed into the bait container 10c mounted fixedly between the top wall 14 and the second floor 13, with the bait container 10c having an insulated housing 10 in surrounding relationship relative to the bait container between the top wall 14 and the second floor 13. A third floor 33 is positioned below the first floor 12, with a third floor integrally mounted in part of the secondary container 10b that is secured to the primary container by employment of latches 34. The secondary container 10b is employed for the storage of various fishing accessories as desired.

First and second rows of resilient C-shaped clamps 35 and 36 are mounted to the apparatus 10, with the first row of C-shaped shaped clamps 35 mounted to the primary container 10a adjacent the top wall 14, with the second row of C-shaped clamps 36 mounted to the secondary container second side wall 32, with each of said first clamps 35 aligned with one of the second clamps 36 in a coaxially aligned relationship to receive a fishing pole permitting ease of transport and storage of such fishing pole structure.

In this manner, it is understood that selective air flow through the third conduit 31 permits aeration of water and associated bait contained within the bait container 10c.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A bait container apparatus, comprising,
   a primary container, with the primary container having a first side wall and a first floor, and
   a top wall, and a second floor spaced between the top wall and the first floor, and
   a flexible resilient pneumatic bladder reservoir mounted between the first floor and the second floor, and a pneumatic pump means mounted between the top wall and the second floor for selective inflation of the bladder reservoir, with the pneumatic pump means having a pump rod reciprocatably and slidably directed through the top wall into the pneumatic pump means, with the pump rod having a handle positioned exteriorly of the top wall, and
   a bait container mounted within the primary container between the top wall and the second floor, with the bait container having an insulated layer surrounding the bait container between the top wall and the floor, and
   conduit means directed into the bait container for directing aeration of the bait container from the bladder reservoir, and
   the conduit means includes a first conduit directed from the pump means into the bladder reservoir, and a valve member mounted to the top wall in pneumatic communication with a second conduit for selective passage of air from the bladder reservoir, and a third conduit directed from the valve into the bait container.

2. An apparatus as set forth in claim 1 including a secondary container mounted to the first floor, wherein the secondary container includes a plurality of latches for securement of the secondary container to the first floor, and a plurality of first resilient C-shaped clamps mounted to the primary container in adjacency to the top wall, and a plurality of second C-shaped clamps mounted to the secondary container, with one of said first C-shaped clamps aligned with one of said second C-shaped clamps for securement of a fishing pole therebetween.

3. An apparatus as set forth in claim 2 wherein the pump means includes a pneumatic pump body having a pump body top wall spaced from a pump body bottom wall, with the pump body top wall positioned in adjacency to the top wall, and the pump body bottom wall positioned in adjacency to the second floor, and the pump rod directed through the pump body having a piston, with the piston including a plurality of piston apertures directed through the piston, and a first web mounted to the piston between the piston and pump body bottom wall, and a valve plate mounted between the piston and the pump body bottom wall, with the valve plate including valve plate apertures, and a flexible second web mounted to the valve plate between the valve plate and the pump body bottom wall, and the pump body top wall including a plurality of pump body top wall apertures directed therethrough.

4. An apparatus as set forth in claim 3 wherein the bait container includes an apertured door plate removably mounted relative to the container arranged for mounting in a coplanar relationship relative to the container top wall.

* * * * *